United States Patent [19]
Pinchuk

[11] Patent Number: 6,074,026
[45] Date of Patent: *Jun. 13, 2000

[54] STORAGE CASE WITH CARTRIDGE RECEIVING UNITS

[76] Inventor: Steven G. Pinchuk, 1370 S. Ocean Blvd., Ste. 2802, Pompano Beach, Fla. 33062

[*] Notice: This patent issued on a continued prosecution application filed under 37 CFR 1.53(d), and is subject to the twenty year patent term provisions of 35 U.S.C. 154(a)(2).

[21] Appl. No.: 08/999,321

[22] Filed: Dec. 29, 1997

[51] Int. Cl.$^7$ ..................................................... A47B 81/06
[52] U.S. Cl. ........................... 312/9.48; 312/216; 211/40
[58] Field of Search ..................................... 312/216, 215, 312/222, 9.9, 9.47, 9.48, 9.64, 311, 351; 211/40, 41

[56] References Cited

U.S. PATENT DOCUMENTS

| | | |
|---|---|---|
| 5,154,291 | 10/1992 | Sur . |
| 5,265,721 | 11/1993 | Castritis . |
| 5,344,028 | 9/1994 | Angele . |
| 5,495,953 | 3/1996 | Bearth . |
| 5,540,328 | 7/1996 | Kohtake . |
| 5,555,977 | 9/1996 | Oshry et al. . |
| 5,579,925 | 12/1996 | Peng . |
| 5,584,397 | 12/1996 | Cheng . |

*Primary Examiner*—Peter M. Cuomo
*Assistant Examiner*—Stephen Vu
*Attorney, Agent, or Firm*—Herbert L. Lerner; Laurence A. Greenberg; Ralph E. Locher

[57] ABSTRACT

A storage unit, comprising a body member which has a substantially box-shape formed of sides walls, a bottom wall, a rear wall, a top cap and a pair of hinged frontal wings which together define a cavity formed in the body member. The pair of hinged frontal wings define an opening between the pair of hinged frontal wings, and at least one cartridge receiving unit is disposed in the cavity formed in the body member for receiving and storing a cartridge such as a compact disk case, a cassette tape case, a ZIP drive disk case, an 8-track tape and other similar media cases.

8 Claims, 8 Drawing Sheets

STORAGE CASE WITH CARTRIDGE RECEIVING UNITS

CROSS-REFERENCE TO RELATED DISCLOSURE DOCUMENT

This application was disclosed in Disclosure Document No. 423385.

BACKGROUND OF THE INVENTION

1. Field of the Invention

The invention relates, generally, to storage cases with cartridge receiving units. More specifically, it relates to a storage case for storing and organizing compact disk cases, tape cases, 8-track cassettes, ZIP drive disks, CD-ROM cases, and other similar type devices.

2. Description of the Related Art

There are many prior art devices configured to provide storage and organization of compact disk cases, cassette tapes, 8-track cassettes, ZIP drive disks and CD-ROM cases. For instance, there are many types of storage cases targeted to storing compact disk cases (jewel boxes). The storage cases generally have a plurality of holding elements for engaging and securing to one end of a compact disk case. In this manner, a row or column of compact disk cases can be held in an organized and compact manner. However, the prior art devices are limited in the ability to add a new compact disk case into the middle of an existing stack of disk cases without going through a prolonged removal and reinsertion process. In general, the prior art storage devices have preset engagement slots or elements for storing the compact disk cases. Since the preset slots are permanently anchored in one place in the storage case or cabinet, inserting one new media into an alphabetized collection of 100 media could mean the removal and reinsertion of up to 99 media in order to properly place the new compact disk in the alphabetized collection. In addition, the prior art storage cases are generally limited to one kind of storage media, such as only compact disk cases.

For instance, U.S. Pat. No. 5,344,028 to Angele teaches a compact disk case storage unit. However, the invention is limited to storing only compact disk cases.

SUMMARY OF THE INVENTION

It is accordingly an object of the invention to provide a storage case with cartridge receiving units which overcomes the above-mentioned disadvantages of the prior art devices and methods of this general type, and which allows the construction of a customized storage case for holding various sized cartridges and allowing for easy removal and replacement of the cartridges.

With the foregoing and other objects in view there is provided, in accordance with the invention, a storage unit, comprising: a body member having a substantially box-shape with sides walls, a bottom wall, a rear wall, a top cap and a pair of hinged frontal wings together defining a cavity therein; the pair of hinged frontal wings defining an opening formed between the pair of hinged frontal wings; and at least one cartridge receiving unit disposed in the cavity of the body member for receiving and storing a cartridge.

In accordance with an added feature of the invention, the at least one cartridge receiving unit is one of a plurality of cartridge receiving units disposed in the cavity.

In accordance with an additional feature of the invention, there is a handle attached to the top cap for assisting in the removal of the top cap from the body member; and a handle attached to each of the hinged frontal wings for assisting in swinging open the hinged frontal wings.

In accordance with another feature of the invention, the at least one cartridge receiving unit has a body member with side walls, a rear wall, a bottom wall, a top wall and a front wall, the body member has a cavity formed therein and dimensioned for receiving and storing the cartridge, and the front wall has an opening formed therein and leading to the cavity.

In accordance with yet another added feature of the invention, the cavity is dimensioned to receive and store a compact disk case.

In accordance with yet another feature of the invention, the cavity is dimensioned to receive and store one of a compact disk case, a ZIP drive disk case, a tape cassette case, and an 8-track tape.

In accordance with an another additional feature of the invention, the cavity is dimensioned to receive and store one of dual compact disk cases, dual cassette tape cases, dual CD-ROM cases, dual ZIP drive disks case and a video tape case.

With the foregoing and other objects in view there is also provided, in accordance with the invention, a storage unit, comprising: a base unit; at least one guide pole secured to and extending perpendicular from the base unit; and at least one cartridge receiving unit having at least one guide pole hole formed therein for receiving the guide pole, and the at least one cartridge receiving unit is dimensioned for receiving and storing a cartridge.

In accordance with an added feature of the invention, the at least one guide pole has a threaded free end extending distally from the base unit, and includes a cap threadingly engaging the free end of the at least one guide pole.

In accordance with another feature of the invention, the at least one cartridge receiving unit is one of a plurality of cartridge receiving units.

In accordance with an additional feature of the invention, the at least one cartridge receiving unit has a body member with side walls, a rear wall, a bottom wall, a top wall and a front wall, the body member having a cavity formed therein and dimensioned for receiving and storing the cartridge, and the front wall has an opening formed therein and leading to the cavity; and including a guide piece which has the at least one guide pole hole formed therein and the guide piece is integrated into the rear wall.

In accordance with yet another added feature of the invention, the cavity is dimensioned to receive and store a compact disk case.

In accordance with yet another feature of the invention, the cavity is dimensioned to receive and store one of a compact disk case, a ZIP drive disk case, a cassette tape case, and an 8-track tape.

In accordance a further added feature of the invention, the cavity is dimensioned to receive and store one of dual compact disk cases, dual cassette tape cases, dual ZIP drive disk cases and a video tape case.

In accordance with yet a further additional feature of the invention, the at least one guide pole hole is two holes and the at least one guide pole is two guide poles.

In accordance with yet another further feature of the invention, the shape of the at least one guide post hole is circular.

In accordance with another added feature of the invention, the shape of the at least one guide post hole is square.

In accordance with a concomitant feature of the invention, the shape of the at least one guide post hole is triangular.

Other characteristic features of the invention are set forth in the appended claims.

Although the invention is illustrated and described herein as embodied in a storage case with cartridge receiving units, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

DESCRIPTION OF THE PREFERRED EMBODIMENTS

Figure 1:
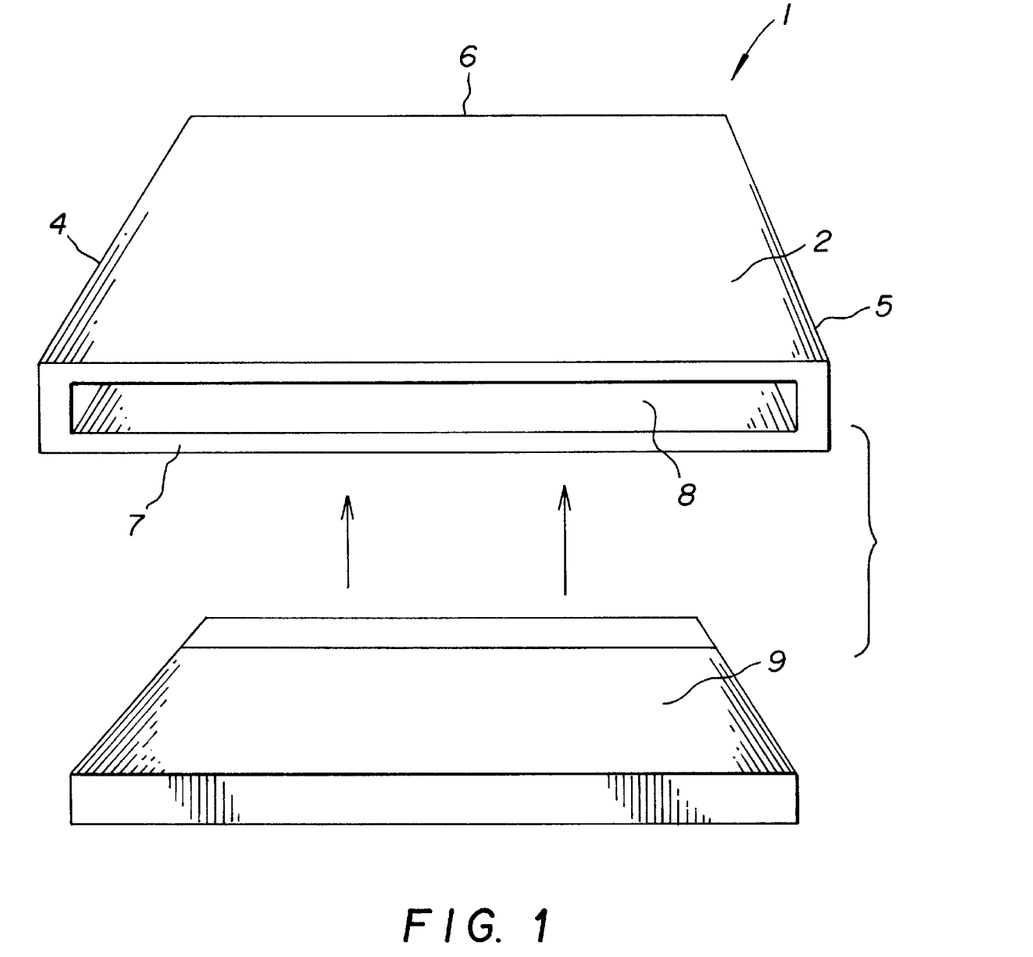
FIG. 1 is a diagrammatic, top perspective view of a first embodiment of a cartridge receiving unit according to the invention.

Referring now to the figures of the drawing in detail and first, particularly, to FIG. 1 thereof, there is shown a cartridge receiving unit 1 having a top 2, a bottom 3, a left side 4, a right side 5, a rear side 6 and a front side 7. The cartridge receiving unit 1 is formed with a cavity 8 at its front side 7 for receiving a cartridge 9 such as a compact disk (CD) case, CD-ROM case or other media cases.

Figure 2:
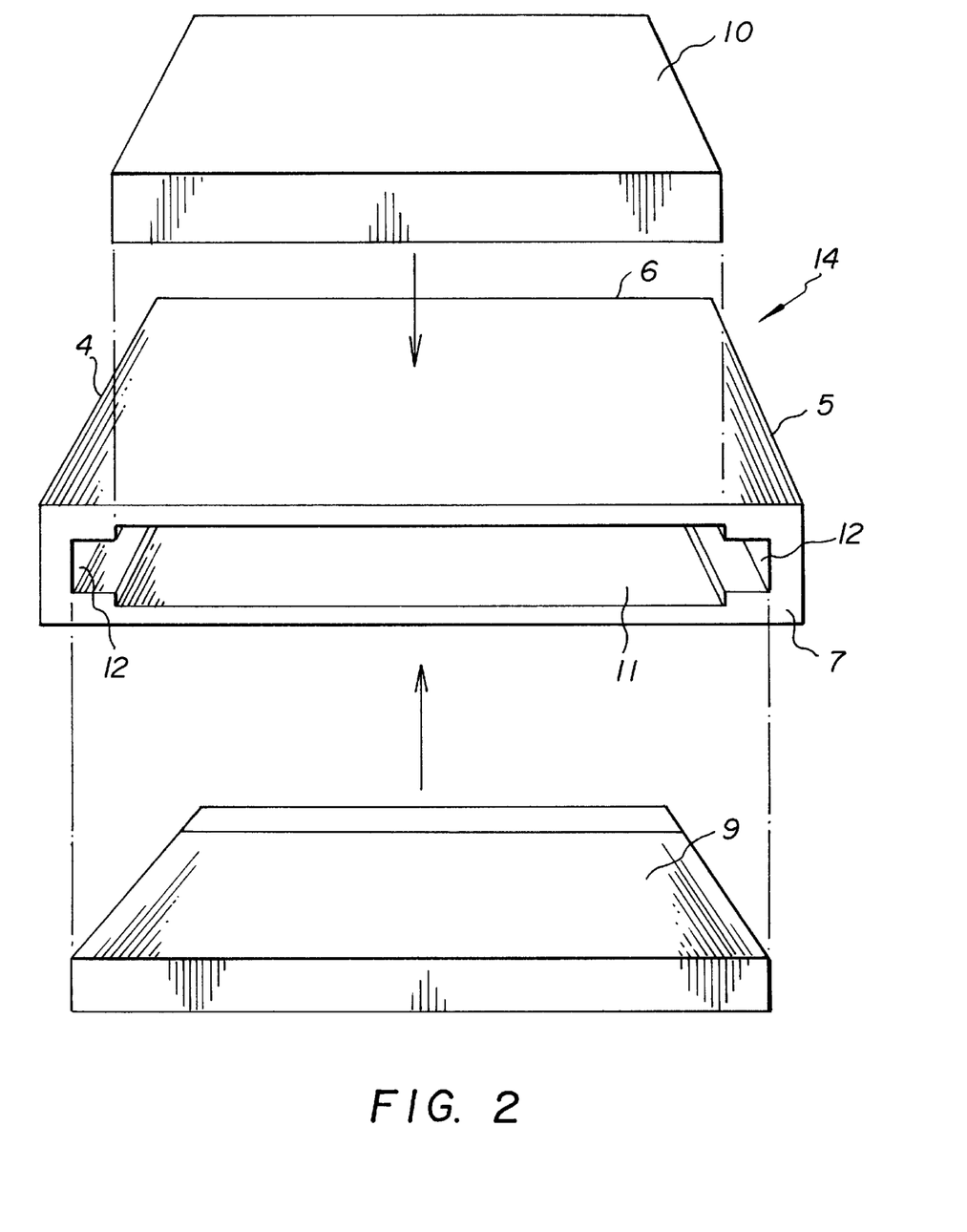
FIG. 2 is a top perspective view of a second embodiment of the cartridge receiving unit.

FIG. 2 shows a second cartridge receiving unit 14 formed with a wider cavity 11 having narrow side regions 12. The cavity 11 is formed such that it may store either the compact disk case 9 and a cassette tape case, a ZIP drive disk case, or an 8-track cassette all shown by the reference numeral 10.

Figure 3:
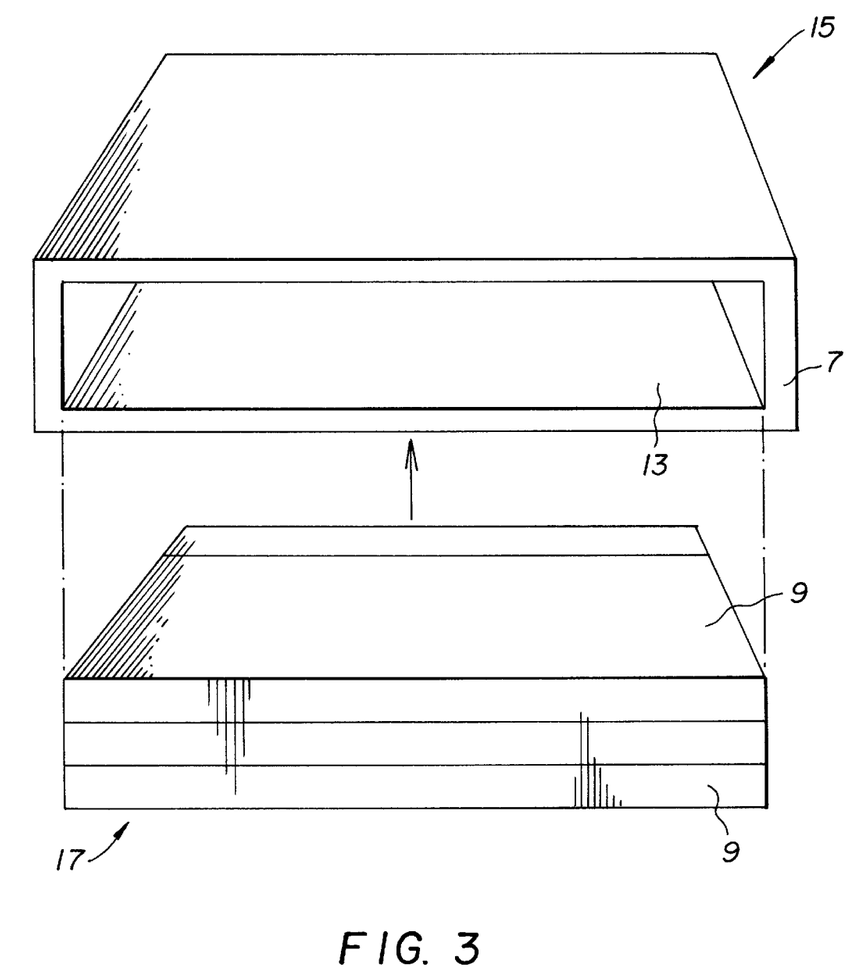
FIG. 3 is a top perspective view of a third embodiment of the cartridge receiving unit.

FIG. 3 shows a third cartridge receiving unit 15 formed with a double wide cavity 13. The double wide cavity 13 is dimensioned to receive an oversized (double sized) media 17 such as dual CD case 9, an 8-track cassette 16 (see FIG. 4), dual cassette tape case, a dual ZIP drive disk case, or a single or dual video tape case.

Figure 4:
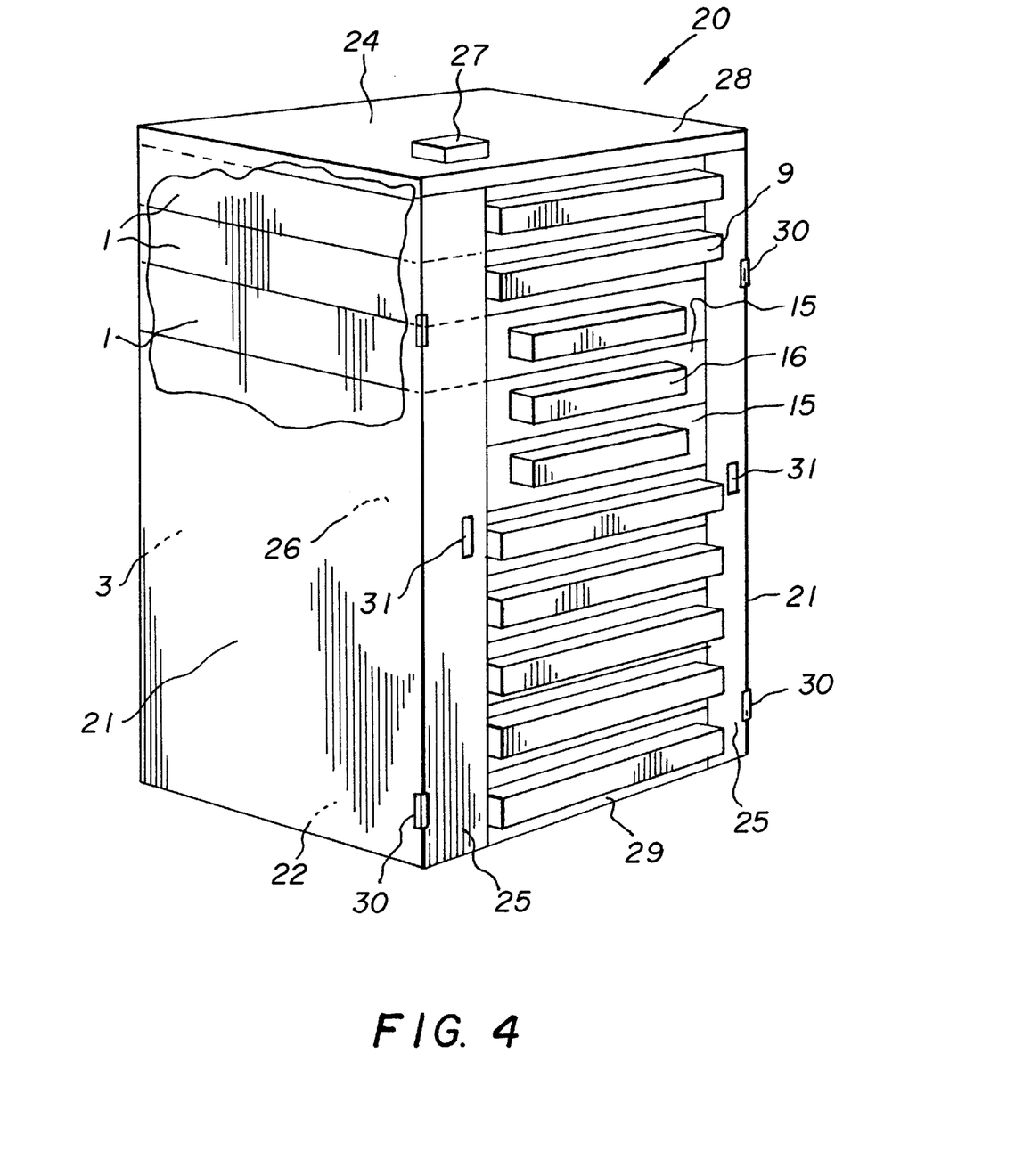
FIG. 4 is a perspective view of a single stack storage case, partly broken-away at one side wall.

FIG. 4 shows a perspective view of a storage unit 20 configured to receive the variously configured cartridge receiving units 1, 14, 15. The storage unit 20 is formed of side walls 21, a bottom wall 22, a back wall 23, a removable top 24 and frontal wings 25. The storage unit 20 contains a cavity area 26 in which the cartridge receiving units 1, 14, 15 are placed into and directly on top of each other. The removable top 24 has an integrally formed handle 27 for assisting in the removal of the top 24. Once the top 24 is removed the receiving cartridge units 1, 14, 15 are laid in the cavity 26 from the top region 28. The cartridges such as CDs 9 contained in the cartridge receiving units 1, 14, 15 are accessible from the opening 29 formed between the frontal wings 25. The cartridge receiving units 1, 14, 15 lay directly on top of each other and are dimensioned to fit snugly in the cavity 26 defined by the walls 21–25 of the storage unit 20. In order to place a new cartridge receiving unit 1, 14, 15 in the middle of the stack, one removes the top 24. Once the top is removed one then removes the easily removable upper cartridge receiving units 1, 14, 15 and then place the new cartridge receiving unit in the appropriate place and restack the previously removed cartridge receiving units 1, 14, 15. With the easily removable cartridge receiving units, one can configure the storage unit 20 to suit ones storage needs.

In addition, the frontal wings 25 have hinges 30 connecting the frontal wings 25 to the side walls 21. The frontal wings 25 are also provided with handles 31 for assisting in swinging open the hinged frontal wings 25. In this manner, one can swing open the frontal wings 25 and directly insert another cartridge receiving unit 1, 14, 15 into the storage unit 20. One can place the new cartridge receiving unit 1, 14, 15 on the top of an existing cartridge receiving unit 1, 14, 15 or one can insert the cartridge receiving unit 1, 14, 15 between existing cartridge receiving units 1, 14, 15 by lifting the upper cartridge receiving unit(s) 1, 14, 15 and inserting the new cartridge receiving unit 1, 14, 15.

With the easy frontal access to the storage unit 20, one can easily add and store various forms of media in a single storage unit 20.

Figure 5:
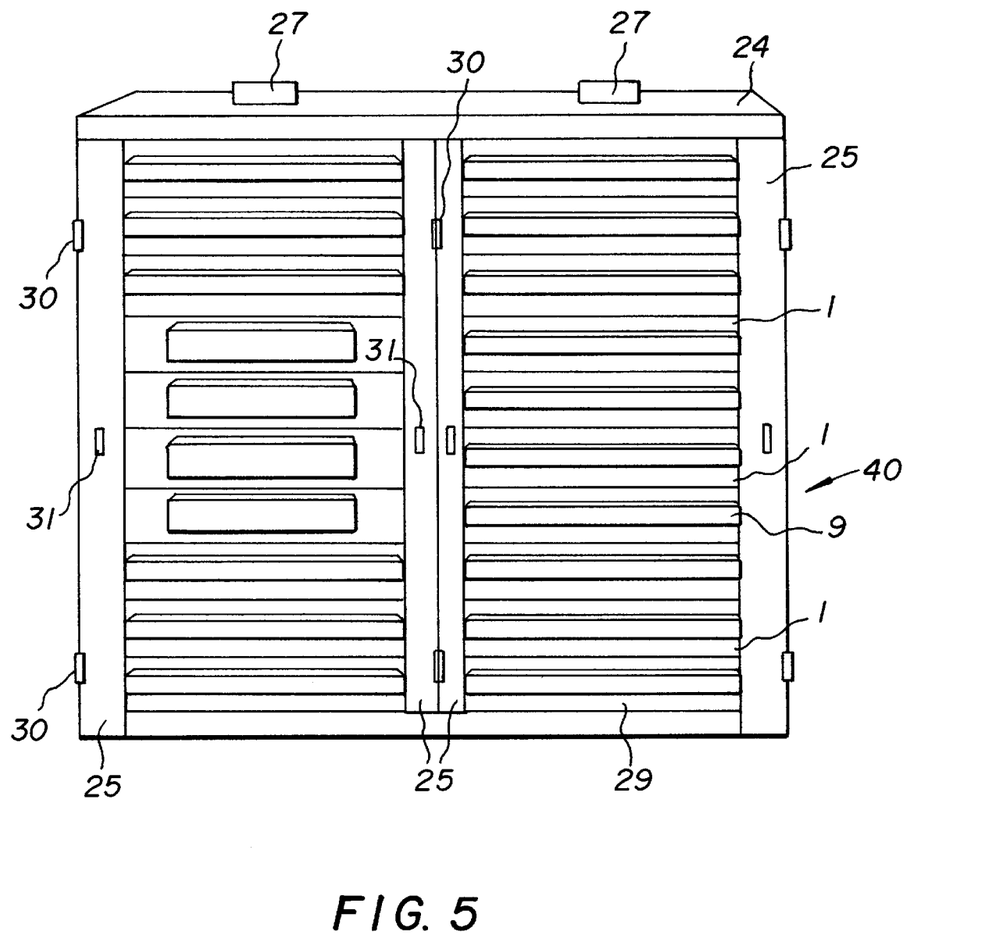
FIG. 5 is a front perspective view of a double stack storage case.

FIG. 5 shows a second embodiment of the storage unit 40. The second storage unit 40 being similar to the first storage unit 20 except the second storage unit 40 is a dual stack storage unit. Of course, it is conceivable that a triple or quad stack storage unit is also feasible. In addition, the height of the storage units 20, 40 can be of any height and is not limited to the height shown in the figures.

Figure 6:
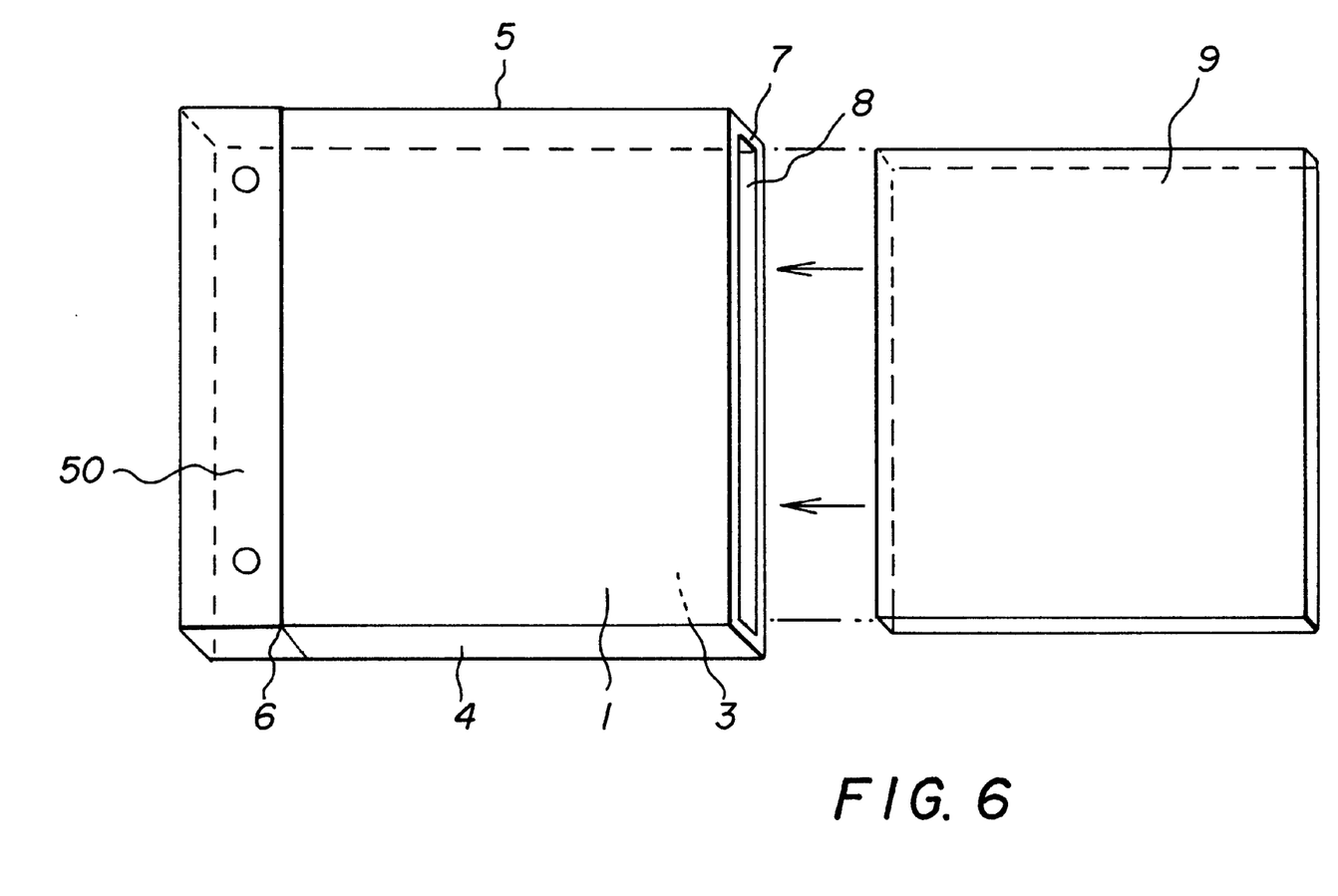
FIG. 6 is a top perspective view of a fourth embodiment of the cartridge receiving unit.
Figure 7:
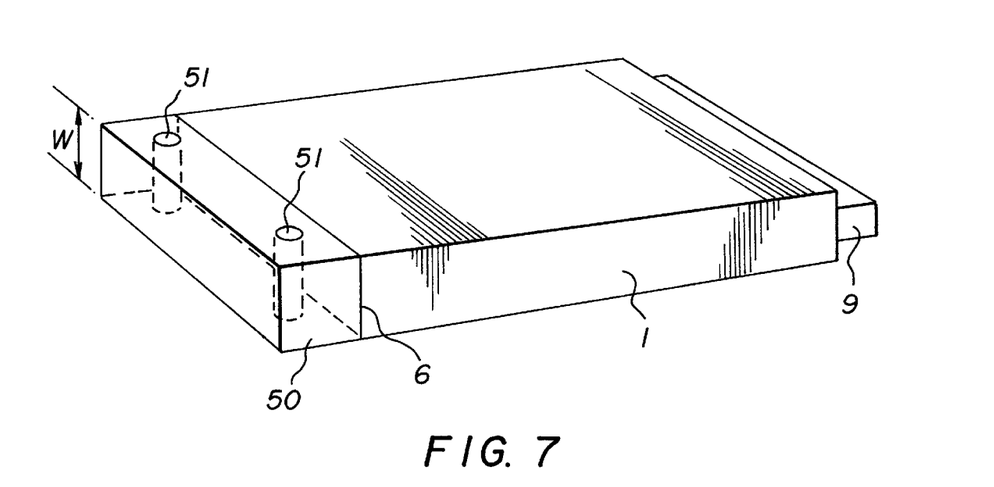
FIG. 7 is a side perspective view thereof.
Figure 8:
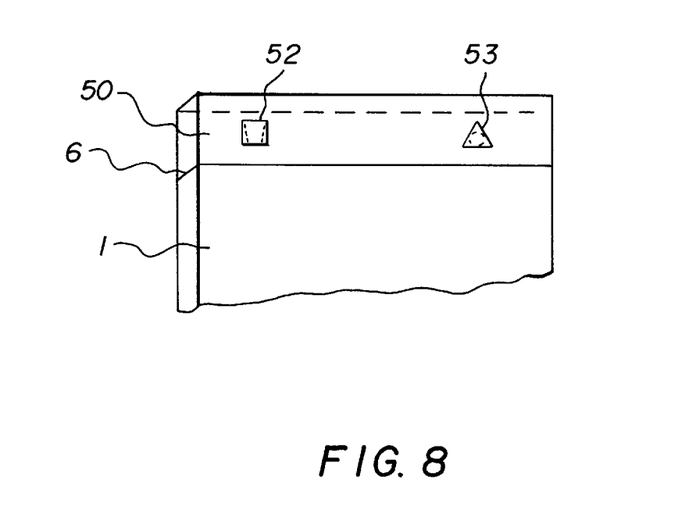
FIG. 8 is a fragmentary, perspective view of the fourth embodiment of the cartridge receiving unit with different guide post holes.

FIGS. 6–8 show a fourth type of the cartridge receiving unit. Integrated into the rear wall 6 of the cartridge receiving unit 1 is a guide piece 50. The guide piece 50 has at least one guide pole hole 51 running through the width W (see FIG. 7) of the guide piece 50. The guide pole holes can be circular 51, square 52 or triangular 53 in shape. Of course many other functional shapes can be used. FIGS. 6–8 only show the cartridge receiving unit 1 with the integrated guide piece 50, however, it is obvious that the guide piece 50 could be integrated into the rear area 6 of the cartridge receiving units 14 and 15.

Figure 9:
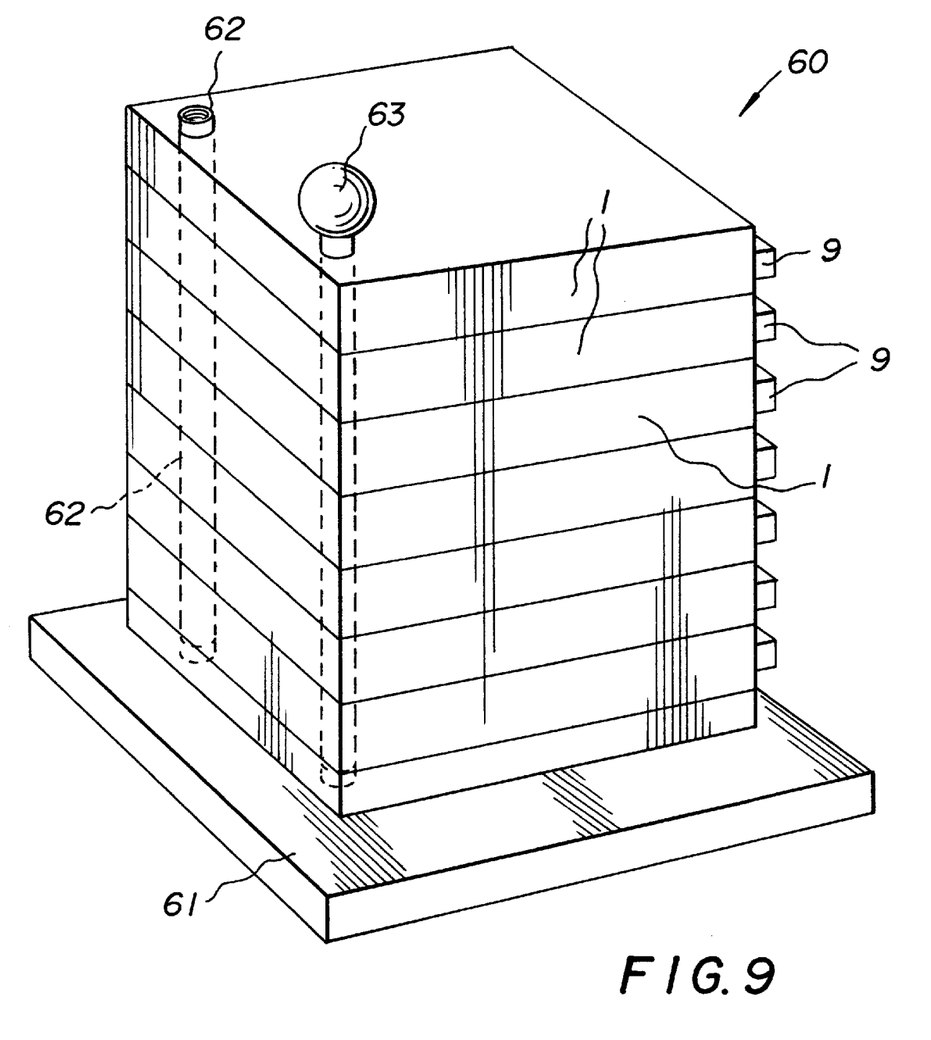
FIG. 9 is a side perspective view of a guide pole configured storage case.

FIG. 9 shows a third embodiment of the storage unit 60. The storage unit 60 is formed of a base 61. Secured to the base 61 are guide poles 62 which have removable caps 63. The cartridge receiving units 1, 14, 15 are guided onto the guide poles 62 via the guide pole holes 51 of the guide pieces 50. The cartridge receiving units 1,14,15 are stacked directed on top of each other and the height of the stack is limited by the height of the guide poles 62. After the cartridge receiving units 1, 14, 15 have been placed on the guide poles 62, the top of the guide poles 62 are secured by the removable caps 63. The caps 63 and the tops of the guide poles 62 are threaded to engage with each other.

The storage units 20, 40, 60 and the cartridge receiving units 1, 14, 15 are made from a material selected from the group consisting of plastics, wood, metals and composites.

I claim:

1. A storage unit comprising:

a body member having a substantially box-shape with sides, a bottom, a rear side, a top cap and a pair of hinged frontal wings together defining a body member cavity therein;

at least two cartridge receiving units including a first cartridge receiving unit and a second cartridge receiving unit disposed in said body member cavity for receiving and storing cartridges, said first cartridge receiving unit resting directly on said second cartridge receiving unit, each of said cartridge receiving units has a cartridge receiving unit body member with side walls, a rear wall, a bottom wall, a top wall and a front wall, said cartridge receiving unit body member having a cartridge receiving cavity formed therein and adapted for receiving and storing a cartridge, and said front wall having an opening formed therein and leading to said cartridge receiving cavity, such that, when said at least two cartridge receiving units are stacked upon each other in said body member cavity, each top wall of a lower cartridge in said stack directly contacting said bottom wall of an upper cartridge located immediately above said lower cartridge and such contact of said top wall of said lower cartridge with said bottom wall of said upper cartridge substantially prevents said lower cartridge from falling out of said stack before said lower cartridge is substantially removed from said body member cavity; and said side walls of each of said cartridge receiving units being substantially flush with said sides of said body member and said rear wall of each of said cartridge receiving units substantially flush with said rear side of said body member when said cartridge receiving units are placed within said body member cavity.

2. The storage unit according to claim 1, wherein said cartridge receiving units are two of a plurality of cartridge receiving units disposed in said cavity.

3. The storage unit according to claim 1, which further comprises a handle attached to said top cap for assisting in the removal of said top cap from said body member; and a handle attached to each of said hinged frontal wings for assisting in swinging open said hinged frontal wings.

4. The storage unit according to claim 1, wherein said cavity of said respective cartridge receiving unit is adapted to receive and store a compact disk case.

5. The storage unit according to claim 1, wherein said cavity of said respective cartridge receiving unit is adapted to receive and store one from a group consisting of a compact disk case, a ZIP drive disk case, a tape cassette case, and an 8-track tape.

6. The storage unit according to claim 1, wherein said cavity of said respective cartridge receiving unit is adapted to receive and store one from a group consisting of dual compact disk cases, dual cassette tape cases, dual CD-ROM cases, dual ZIP drive disk cases and a video tape case.

7. A storage unit comprising:

a body member having sides, a bottom, a rear side, and a pair of hinged frontal wings together defining a body member cavity therein;

at least two cartridge receiving units including a first cartridge receiving unit and a second cartridge receiving unit disposed in said body member cavity for receiving and storing cartridges, said first cartridge receiving unit resting directly on said second cartridge receiving unit, each of said cartridge receiving units has a cartridge receiving unit body member with side walls, a rear wall, a bottom wall, a top wall and a front-wall, said cartridge receiving unit body member having a cartridge receiving cavity formed therein and adapted for receiving and storing a cartridge, and said front wall having an opening formed therein and leading to said cartridge receiving cavity, such that, when said cartridge receiving units are stacked upon each other in said body member cavity, each top wall of a lower cartridge in said stack directly contacting said bottom wall of an upper cartridge located immediately above said lower cartridge and such contact of said top wall of said lower cartridge with said bottom wall of said upper cartridge substantially prevents said lower cartridge from falling out of said stack before said lower cartridge is substantially removed from said body member cavity; and said side walls of each of said cartridge receiving units being substantially flush with said sides of said body member and said rear wall of each of said cartridge receiving units substantially flush with said rear side of said body member when said cartridge receiving units are placed within said body member cavity.

8. A storage unit comprising:

a body member having sides, a bottom, a rear side, and a pair of hinged frontal wings together defining a body member cavity therein;

at least two cartridge receiving units including a first cartridge receiving unit and a second cartridge receiving unit disposed in said body member cavity for receiving and storing cartridges, said first cartridge receiving unit resting directly on said second cartridge receiving unit, each of said cartridge receiving units has a cartridge receiving unit body member with side walls, a rear wall, a bottom wall, a top wall and a front wall, said cartridge receiving unit body member having a cartridge receiving cavity formed therein and dimensioned for receiving and storing a cartridge, and said front wall having an opening formed therein and leading to said cartridge receiving cavity, such that, when said cartridge receiving units are stacked upon each other in said body member cavity, each top wall of a lower cartridge in said stack directly contacting said bottom wall of an upper cartridge located immediately above said lower cartridge; and said side walls of each of said cartridge receiving units being substantially flush with said sides of said body member and said rear wall of each of said cartridge receiving units substantially flush with said rear side of said body member when said cartridge receiving units are placed within said body member cavity.

* * * * *